(12) United States Patent
Takashima et al.

(10) Patent No.: US 10,767,979 B2
(45) Date of Patent: Sep. 8, 2020

(54) OPTICAL MEASUREMENT DEVICE AND OPTICAL MEASUREMENT METHOD

(71) Applicant: OMRON Corporation, Kyoto (JP)

(72) Inventors: Jun Takashima, Kyoto (JP); Tomonori Kondo, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/248,811

(22) Filed: Jan. 16, 2019

(65) Prior Publication Data
US 2019/0285400 A1   Sep. 19, 2019

(30) Foreign Application Priority Data

Mar. 13, 2018 (JP) ................. 2018-045662

(51) Int. Cl.
*G01B 11/14* (2006.01)
*G01B 11/02* (2006.01)
*G01N 21/01* (2006.01)

(52) U.S. Cl.
CPC ............ *G01B 11/14* (2013.01); *G01B 11/026* (2013.01); *G01N 21/01* (2013.01); *G01B 2210/50* (2013.01)

(58) Field of Classification Search
CPC .............. G01B 11/026; G01B 2210/50; G01B 11/0608; G01B 9/02091; G01B 11/00;
(Continued)

(56) References Cited

U.S. PATENT DOCUMENTS

2008/0088856 A1* 4/2008 Nishio ................. G01B 11/026
356/623
2010/0232650 A1* 9/2010 Kanetani ............ G01B 11/0608
382/106
(Continued)

FOREIGN PATENT DOCUMENTS

JP   2013122428   6/2013
JP   2013174593   9/2013
(Continued)

OTHER PUBLICATIONS

"Search Report of Europe Counterpart Application", dated Aug. 27, 2019, p. 1-p. 9.
(Continued)

*Primary Examiner* — Michael P Stafira
(74) *Attorney, Agent, or Firm* — JCIPRNET (57) ABSTRACT

An error of a measured distance is reduced. An optical measurement device (100) includes: a light source (10), which emits lights; a sensor head (30), which condenses reflected lights reflected by a target (TA); a light reception portion (40), which is configured in a manner that each of a plurality of pixels is capable of detecting a light reception amount, and which obtains a light reception amount distribution signal of each pixel for the condensed reflected lights; a measurement portion (51), which measures a distance from the optical measurement device (100) to the target (TA) based on the light reception amount distribution signal; and a correction portion (52), which corrects the measured distance that is measured based on a predefined characteristic value in a waveform of the light reception amount distribution signal.

14 Claims, 10 Drawing Sheets

(58) Field of Classification Search
CPC ............ G01B 2290/70; G01B 2290/45; G01B 2290/60; G01B 9/02002; G01B 9/02007; G01B 9/02011; G01B 9/02072; G01B 9/02057; G01B 9/02063; G01B 9/02067; G01B 9/02069; G01B 9/02071; G01B 9/02078; G01B 9/02083; G01B 9/0209; G01B 11/0691; G01B 11/165; G01B 15/00; G01B 2210/58; G01B 7/18; G01B 11/002; G01B 11/24; G01B 15/04; G01B 2210/44; G01B 7/023; G01B 7/107; G01B 11/14; G01B 11/25; G01B 11/272; G01B 21/045; G01B 11/005; G01B 11/06; G01B 11/0633; G01B 11/162; G01B 11/167; G01B 11/2509; G01B 11/2545; G01B 11/26; G01B 11/275; G01B 11/2755; G01B 11/285; G01B 11/30; G01B 21/042; G01B 21/06; G01B 2210/12; G01B 2210/14; G01B 9/02004; G01B 9/02029; G01B 9/02044; G01B 9/0205; G01B 9/0207; G01J 9/04; G01J 1/4228; G01N 21/45; G01N 2223/1006; G01N 2223/3306; G01N 2223/419; G01N 2021/479; G01N 23/046; G01N 23/083; G01N 33/346; G01N 21/6456; G01N 2021/6419; G01N 2021/8427; G01N 2021/95615; G01N 21/255; G01N 21/4788; G01N 21/4795; G01N 21/64; G01N 21/6428; G01N 21/65; G01N 21/8422; G01N 21/9054; G01N 21/93; G01N 21/95607; G01N 2201/0866; G01N 2291/0427; G01N 27/026; G01N 29/2406; G01N 29/2437; G01N 33/42; G01N 21/21; G01N 21/3581; G01N 21/59; G01N 2333/4709; G01N 2201/0675; G01N 21/01; G01N 33/52; G01N 33/54366; G01N 33/54386; G01N 2001/302; G01N 2015/0065; G01N 2015/1497; G01N 2021/1776; G01N 2021/655; G01N 2030/945; G01N 2033/4975; G01N 21/25; G01N 21/251; G01N 21/253; G01N 21/35; G01N 21/47; G01N 21/55; G01N 21/76; G01N 2496/05; G01N 33/49; G01N 33/497; G01N 33/5094; G01N 33/53; G01N 33/54353; G01N 33/54393; G01N 21/6486; G01N 2800/2821; G01N 33/483; G01N 33/487; G01N 33/6896; G01N 21/17; G01N 21/636; G01N 21/78; G01N 2201/0221; G01N 33/48728; G01N 33/5061; G01N 15/1463; G01N 1/22; G01N 1/2214; G01N 1/2247; G01N 1/30; G01N 1/31; G01N 1/312; G01N 2001/2244; G01N 21/272; G01N 21/645; G01N 33/492; G01N 33/5304; G01N 33/54306; G01N 33/54326; G02B 2027/0138; G02B 2027/014; G02B 27/0172; G02B 13/22; G02B 26/101; G02B 27/283; G02B 7/38; A61B 5/1427; A61B 2560/0412; A61B 5/0024; A61B 5/6833; A61B 5/0075; A61B 17/8014; A61B 2503/42; A61B 17/221; A61B 17/320725; A61B 17/80; A61B 17/8042; A61B 17/8052; A61B 17/8057; A61B 17/8061; A61B 17/8085; A61B 17/809; A61B 17/8605; A61B 2017/00867; A61B 5/150022; A61B 5/150175; A61B 1/150358; A61B 5/150389; A61B 5/150503; A61B 5/15107; A61B 5/15117; A61B 5/15119; A61B 5/15121; A61B 5/15123; A61B 5/15125; A61B 5/15186; A61B 17/12118; A61B 17/1214; A61B 17/1725; A61B 17/1739; A61B 17/1782; A61B 17/22031; A61B 17/68; A61B 17/848; A61B 17/863; A61B 17/8645; A61B 17/8685; A61B 2017/00309; A61B 2017/22034; A61B 2017/22038; A61B 2017/22094; A61B 2017/2212; A61B 2017/2215; A61B 2017/32096; A61B 2090/061; A61B 5/00; A61B 5/0022; A61B 5/0833; A61B 5/0836; A61B 5/097; A61B 5/1071; A61B 5/1072; A61B 5/1077; A61B 5/4851; A61B 5/6822
See application file for complete search history.

(56) References Cited

U.S. PATENT DOCUMENTS

| | | | |
|---|---|---|---|
| 2013/0197372 A1* | 8/2013 | Hijikuro | G01N 21/6486 600/476 |
| 2013/0222815 A1 | 8/2013 | Patzwald | |
| 2018/0274902 A1* | 9/2018 | Kuga | G01B 11/0608 |
| 2018/0274903 A1* | 9/2018 | Kuga | G01B 11/0608 |

FOREIGN PATENT DOCUMENTS

| | | |
|---|---|---|
| JP | 2017116509 | 6/2017 |
| WO | WO 2017/110838 A1 * | 6/2017 |

OTHER PUBLICATIONS

"Office Action of Taiwan Counterpart Application," with English translation thereof, dated Dec. 12, 2019, p. 1-p. 11.
Office Action of Korean Counterpart Application, with English translation thereof, dated Mar. 10, 2020, pp. 1-9.

* cited by examiner

FIG. 10

OPTICAL MEASUREMENT DEVICE AND OPTICAL MEASUREMENT METHOD

CROSS-REFERENCE TO RELATED APPLICATION

This application claims the priority of Japan patent application serial no. 2018-045662, filed on Mar. 13, 2018. The entirety of the above-mentioned patent application is hereby incorporated by reference herein and made a part of this specification.

BACKGROUND

Technical Field

The disclosure relates to an optical measurement device and an optical measurement method.

Related Art

Conventionally, a measurement error correction device of an optical measurement device is known which includes: a structure analysis displacement estimation means, by which a structure analysis is implemented using a structure analysis model of a structure body, and a structure analysis displacement, which is a displacement of a measurement subject location with respect to a reference location in the structure body, is estimated; and an error correction means, by which an error of an optical displacement measurement is corrected based on a measurement result in the optical displacement measurement device and an estimated structure analysis displacement (see patent literature 1). The measurement error correction device can carry out a measurement for disturbance having strong non-stationarity, and correct a measurement error of the optical measurement device while preventing complication of the entire device.

[Patent literature 1] Japanese Laid-Open No. 2013-122428

On the other hand, an optical measurement device, which obtains a light reception amount distribution signal of each pixel for lights condensed by an optical system such as a lens or the like and measures a distance from the device to a target based on the light reception amount distribution signal, is known.

However, there is an occasion that a distortion is generated in the light reception amount distribution signal because of an aberration of an optical system or the like in the optical measurement device. Therefore, if the distance is measured based on the light reception amount distribution signal, the measured distance has a great difference (hereinafter referred to as "error") from a true value.

SUMMARY

The disclosure provides an optical measurement device and an optical measurement method capable of reducing an error of a measured distance.

An optical measurement device of one aspect of the disclosure is an optical measurement device and includes: a light source, which emits lights; an optical system, which condenses reflected lights reflected by a target; a light reception portion, which is configured in a manner that each of a plurality of pixels is capable of detecting a light reception amount, and which obtains a light reception amount distribution signal of each pixel for the condensed reflected lights; a measurement portion, which measures a distance from the optical measurement device to the target based on the light reception amount distribution signal; and a correction portion, which corrects the measured distance based on a predefined characteristic value in a waveform of the light reception amount distribution signal.

In addition, an optical measurement method of another aspect of the disclosure is an optical measurement method used by the optical measurement device and includes: a step in which a light source emits lights; a step in which an optical system condenses reflected lights reflected by a target; a step in which a light reception portion obtains a light reception amount distribution signal of each pixel for the condensed reflected lights and in which the light reception portion is configured in a manner that each of plurality of pixels is capable of detecting a light reception amount; a step in which a measurement portion measures a distance from the optical measurement device to the target based on the light reception amount distribution signal; and a step in which a correction portion corrects the measured distance based on a predefined characteristic value in a waveform of the light reception amount distribution signal.

DESCRIPTION OF THE EMBODIMENTS

Embodiments of the disclosure are described with reference to attached drawings. Furthermore, in each diagram, components denoted with the same symbol have the same or similar configuration.

Figure 1:
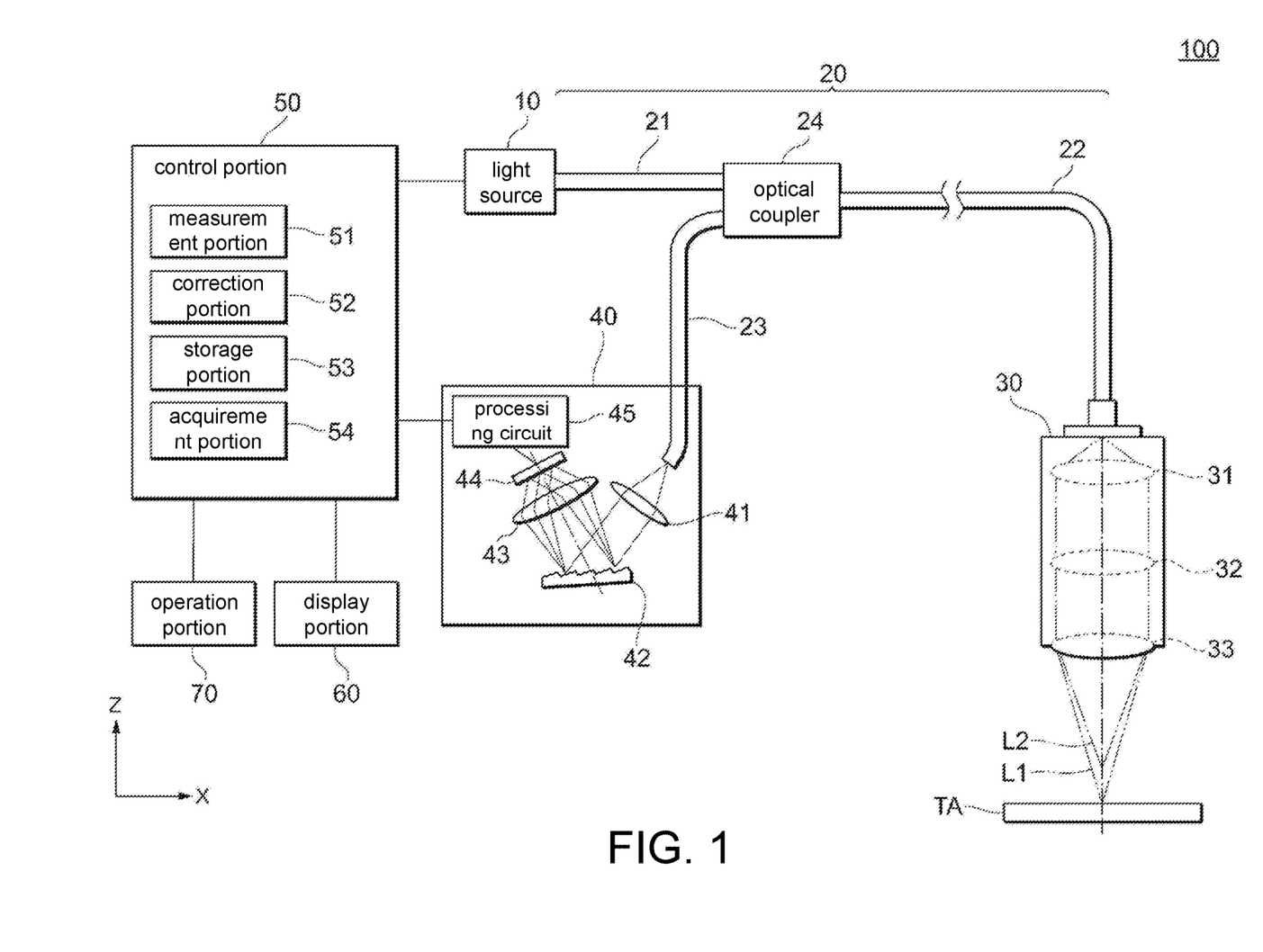
FIG. 1 is a configuration diagram illustrating a schematic configuration of an optical measurement device of the embodiment.

First, a configuration of an optical measurement device of the embodiment is described with reference to FIG. 1. FIG. 1 is a configuration diagram illustrating a schematic configuration of an optical measurement device 100 of the embodiment.

As shown in FIG. 1, the optical measurement device 100 includes a light source 10, a light guiding portion 20, a sensor head 30, a light reception portion 40, a control portion 50, a display portion 60, and an operation portion 70. The optical measurement device 100 measures, in a predefined measurement period, a distance from the device, particularly from the sensor head 30 to a target TA. In addition, the optical measurement device 100 can also measure a change of a distance which uses a certain location as a reference, that is, a displacement.

The light source 10 is configured to emit lights including a plurality of wavelength components. The light source 10 moves based on a control signal input from the control portion 50, for example, alters an amount of the lights based on the control signal.

Preferably, the light source 10 emits the lights including the plurality of wavelength components. On this occasion, the light source 10 is configured, for example, including a white LED (Light Emitting Diode), and emits white lights. However, the lights emitted by the light source 10 are not limited to the white lights as long as the lights include a wavelength range covering a distance range required by the optical measurement device 100.

The light guiding portion 20 is used to propagate the lights. The light guiding portion 20 is provided with, for example, a first cable 21, a second cable 22, a third cable 23, and a light coupler 24.

One end (a left end in FIG. 1) of the first cable 21 is optically connected to the light source 10. One end (a right end in FIG. 1) of the second cable 22 is optically connected to the sensor head 30. One end (a left end in FIG. 1) of the third cable 23 is optically connected to the light reception portion 40. The other end (a right end in FIG. 1) of the first cable 21 and the other end (a right end in FIG. 1) of the third cable 23 are optically linked with the other end (a left end in FIG. 1) of the second cable 22 via the light coupler 24.

The light coupler 24 transmits lights incident from the first cable 21 to the second cable 22, and divides the lights incident from the second cable 22 to transmit the lights to the first cable 21 and the third cable 23 respectively. Furthermore, the lights transmitted by the light coupler 24 from the second cable 22 to the first cable 21 are terminated in the light source 10.

The optical coupler 24 is configured to include, for example, an optical coupler of a fused and drawn type (melt-drawn type). On the other hand, the first cable 21, the second cable 22, and the third cable 23 are respectively configured, for example, by an optical fibre. Each optical fibre may be a single-core having a single core or a multi-core having a plurality of cores.

The sensor head 30 is used to irradiate the lights to the target TA. In addition, the sensor head 30 is used to condense reflected lights from the target TA. The sensor head 30 includes, for example, a collimator lens 31, a diffraction lens 32, and an objective lens 33.

The collimator lens 31 is configured to convert the lights incident from the second cable into parallel lights. The diffraction lens 32 is configured to generate a chromatic aberration along an optical axis direction in the parallel lights. The objective lens 33 is configured to focus and irradiate the lights, in which the chromatic aberration is generated, to the target TA. Because axial chromatic aberration is generated by the diffraction lens 32, the lights which are irradiated from the objective lens 33 have a focus on different distances (locations) for each wavelength.

In an example shown in FIG. 1, a light L1 with a first wavelength which has a relatively long focus distance and a light L2 with a second wavelength which has a relatively short focus distance are shown. The light L1 with the first wavelength is focused (is set with a focus) on a surface of the target TA, whereas the light L2 with the second wavelength is focused (is set as a focus) in front of the target TA.

The lights reflected on the surface of the target TA are condensed by the collimator lens 31 through the objective lens 33 and the diffraction lens 32 and are incident to the second cable 22. The light L1 with the first wavelength in the reflected lights is focused on an end surface of the second cable 22 which is confocal, and most of the light L1 is incident to the second cable 22. On the other hand, the lights with other wavelengths are not focused on the end surface of the second cable 22 and are not incident to the second cable 22. The reflected lights incident to the second cable 22 are partially transmitted to the third cable 23 by the light coupler 24 and are emitted to the light reception portion 40.

When the second cable 22 is an optical fibre, the core corresponds to a pinhole. Therefore, by decreasing a core diameter of the optical fibre, the pinhole which condenses the reflected lights becomes small and the light with the wavelength which is focused on the surface of the target TA can be detected stably.

Furthermore, the sensor head 30 according to the embodiment corresponds to one example of an "optical system" of the disclosure. In addition, the collimator lens 31 according to the embodiment corresponds to one example of a "condenser lens" of the disclosure.

As described above, by including a single collimator lens 31 as the condenser lens for condensing the reflected lights in the sensor head 30, compared with an occasion when a plurality of condenser lenses are included, the sensor head 30 can be simplified.

The light reception portion 40 is used to obtain a light reception amount distribution signal described later for the reflected lights that are reflected by the surface of the target TA and condensed by the sensor head 30. The light reception portion 40 includes, for example, a collimator lens 41, a diffraction grating 42, an adjustment lens 43, a light reception sensor 44, and a processing circuit 45.

The collimator lens 41 is configured to convert the lights incident from the third cable into parallel lights. The diffraction grating 42 is configured to disperse (split) the parallel lights into each wavelength component. The adjustment lens 43 is configured to adjust spot diameters of the dispersed lights with different wavelengths.

The light reception sensor 44 is configured to be capable of detecting a light reception amount in each wavelength component for the dispersed lights. The light reception sensor 44 is configured to include a plurality of light reception elements. Each light reception element is one-dimensionally arranged corresponding to a dispersing direction of the diffraction grating 42. Accordingly, each light reception element is disposed corresponding to the dispersed light of each wavelength component, and the light reception sensor 44 can detect the light reception amount for each wavelength component.

One light reception element of the light reception sensor 44 corresponds to one pixel. Therefore, the light reception sensor 44 can be said to be configured in a manner that each of the plurality of pixels is capable of detecting the light reception amount. Furthermore, each light reception element is not limited to be one-dimensionally arranged, and can also be two-dimensionally arranged. Preferably, each light reception element is two-dimensionally arranged, for example, on a detection surface including the dispersing direction of the diffraction grating 42.

Each light reception element accumulates electric charges based on a control signal input from the processing circuit 45 and corresponding to the light reception amount of the light received during a predefined light exposure time. Besides, each light reception element outputs electric signals corresponding to the accumulated electric charges outside the light exposure time; that is, during a non-light-exposure time, based on the control signal input from the processing circuit 45. Accordingly, the light reception amount received during the light exposure time is converted into the electric signals.

The processing circuit 45 is configured to control a light reception by the light reception sensor 44. In addition, the processing circuit 45 is configured to carry out a signal processing for outputting the electric signals input from each light reception element of the light reception sensor 44 to the control portion 50. The processing circuit 45 is configured to include, for example, an amplification circuit and an A/D (Analog-to-Digital) conversion circuit. The amplification circuit amplifies the electric signals input from each light reception element by a predefined gain respectively. Then, the A/D conversion circuit samples, quantizes and encodes the amplified electric signals of each light reception element to convert the amplified electric signals into digital signals. In this way, the light reception amount detected by each light reception element is converted into a digital value, and a distribution signal of the light reception amount of each light reception element, that is, each pixel (simply referred to as "light reception amount distribution signal" hereinafter) is obtained. The processing circuit 45 outputs the light reception amount distribution signal to the control portion 50.

The control portion 50 is configured to control movements of each portion of the optical measurement device 100. The control portion 50 is configured to include, for example, a microprocessor such as a CPU (Central Processing Unit) or the like, and a memory such as an ROM (Read Only Memory), an RAM (Random Access Memory), a buffer memory or the like. The control portion 50 includes, for example, a measurement portion 51, a correction portion 52, a storage portion 53 and an acquirement portion 54, as functional configurations.

The measurement portion 51 is configured to measure, based on the light reception amount distribution signal, a distance from the optical measurement device 100 to the target TA, to be exact, a distance from the sensor head 30 to the target TA. In the example shown in FIG. 1, the distance is the distance in an Z-axis direction.

Figure 2:
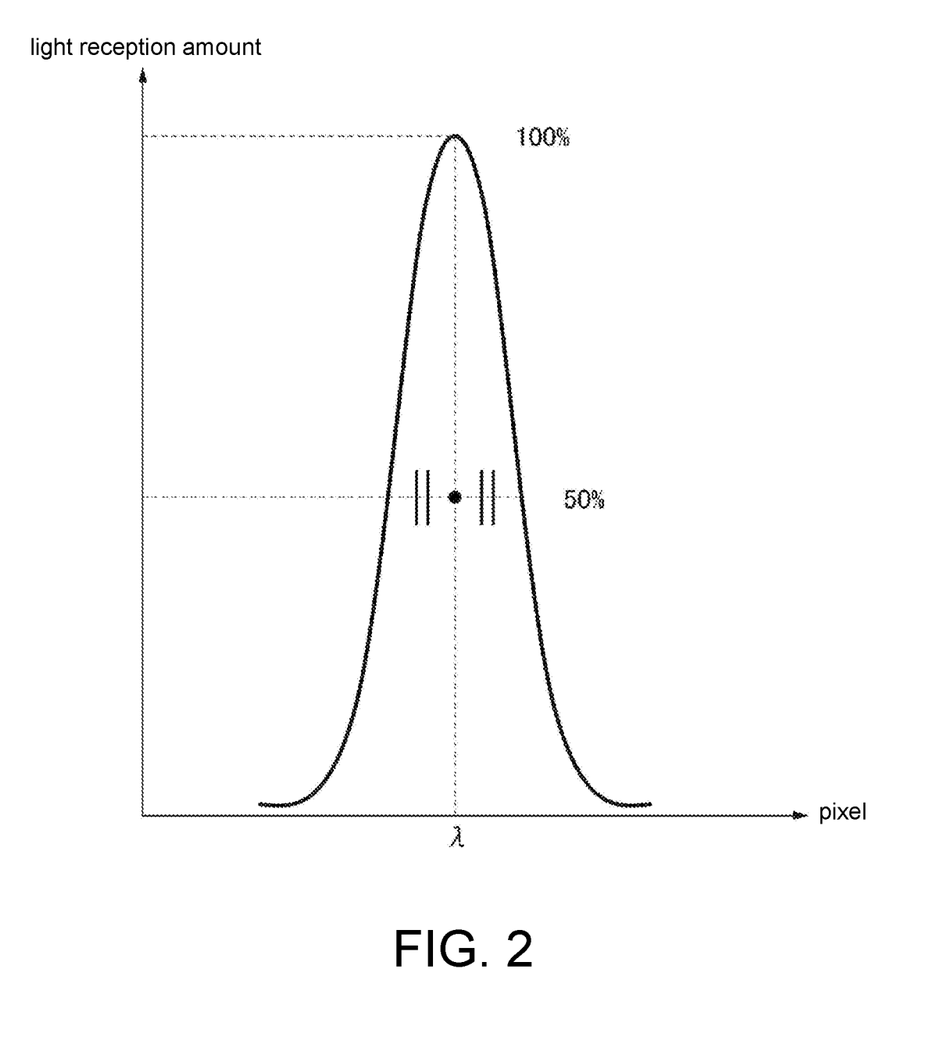
FIG. 2 is a waveform diagram illustrating one example of a light reception amount distribution signal.
Figure 3:
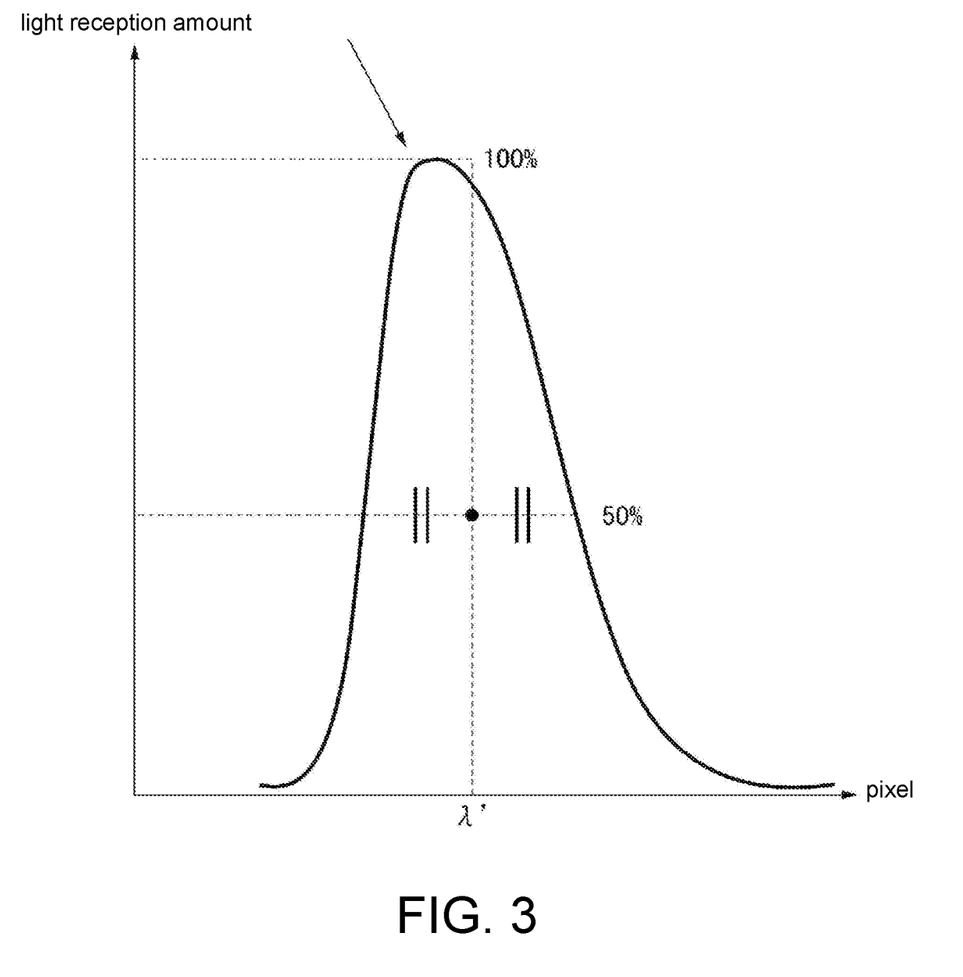
FIG. 3 is a waveform diagram illustrating another example of a light reception amount distribution signal.

Here, a measurement of the distance based on the light reception amount distribution signal is described with reference to FIG. 2 and FIG. 3. FIG. 2 is a waveform diagram illustrating one example of the light reception amount distribution signal. FIG. 3 is a waveform diagram illustrating another example of the light reception amount distribution signal. In FIG. 2 and FIG. 3, a horizontal axis represents the pixel (each light reception element of the light reception sensor 44), and a vertical axis represents the light reception amount.

As shown in FIG. 2, usually, the light reception amount distribution signal has a waveform in which a light reception amount of some pixel becomes a peak. As described above, the distance from the sensor head 30 to a point where the light is focused varies with the wavelength, so that the pixel with a peak light reception amount in the light reception amount distribution signal obtained from the light reception sensor 44 is the pixel that corresponds to the wavelength of the light which is irradiated from the sensor head 30 and focused on the target TA. Besides, the wavelength corresponds to the distance from the sensor head 30 to the target TA. In the example shown in FIG. 1, the light L1 with the first wavelength which is focused on the surface of the target TA is expressed as the wavelength of the peak light reception amount of the light reception amount distribution signal.

Specifically, when the peak light reception amount of the light reception amount distribution signal is set to 100%, a midpoint of two intersection points of a line of 50% light reception amount and the light reception amount distribution signal is obtained, and a wavelength $\lambda$ corresponding to the pixel of the midpoint is obtained.

A relationship (a correspondence) between the wavelength $\lambda$ and the distance is stored in advance in the memory of the control portion 50 or the like. The measurement portion 51 measures, with reference to the relationship, the distance from the sensor head 30 to the target TA based on the light reception amount distribution signal of the reflected lights.

On the other hand, as shown in FIG. 3, because of an influence of an aberration of the sensor head 30 or the like, a distortion is generated in the light reception amount distribution signal. At this time, when a wavelength $\lambda'$ corresponding to the pixel of the midpoint in two intersection points of the line of 50% light reception amount of the peak light reception amount and the light reception amount distribution signal is obtained in a similar way as described above, an error between the distance measured by the measurement portion 51 (referred to as "measured distance" hereinafter) and a true value increases. The error is more apparent when the sensor head 30 includes single condenser lens.

Returning to the description of FIG. 1, the correction portion 52 is configured to correct, based on predefined characteristic value in the waveform of the light reception amount distribution signal, the measured distance that is measured by the measurement portion 51.

The inventor of the disclosure finds out that there are correlative relationships between the predefined characteristic values in the waveform of the light reception amount distribution signal and the error of the measured distance. Therefore, the measured distance can be corrected based on the predefined characteristic values in the waveform of the light reception amount distribution signal by using the correlative relationships. Therefore, even if the distortion is generated in the light reception amount distribution signal, the error of the measured distance can be reduced.

The storage portion 53 is configured to store a program, data or the like. In addition, the storage portion 53 is configured to store the correlative relationship between the predefined characteristic value in the waveform of the light reception amount distribution signal and the error of the measured distance.

Figure 4:
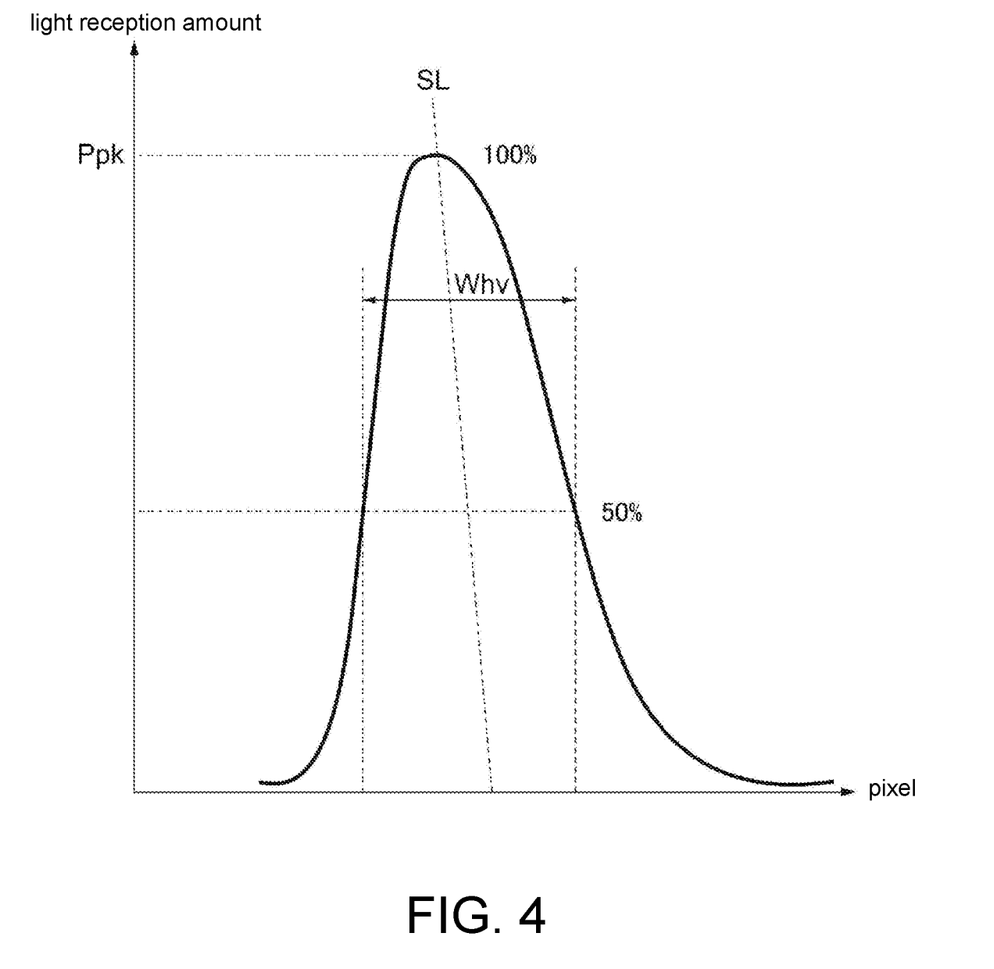
FIG. 4 is a waveform diagram illustrating predefined characteristic values in a waveform of the light reception amount distribution signal.

Here, the predefined characteristic values in the waveform of the light reception amount distribution signal are described with reference to FIG. 4. FIG. 4 is a waveform diagram illustrating the predefined characteristic values in the waveform of the light reception amount distribution signal. In FIG. 4, the horizontal axis represents the pixel (each light reception element of the light reception sensor 44), and the vertical axis represents the light reception amount.

As shown in FIG. 4, in the waveform of the light reception amount distribution signal in which the distortion is generated, a half-value width Whv is a value that shows a length (a width) between the two intersection points of the line of 50% light reception amount of a peak light reception amount Ppk and the light reception amount distribution signal. In addition, a slope SL is a value that shows a slope of a straight line through at least two midpoints, and the midpoints which are the midpoints of the intersection points of lines of light reception amounts of at least two values and the light reception amount distribution signal are obtained in a range greater than 0% and below 100% of the peak light reception amount Ppk. For example, from a midpoint of intersection points of the line of 50% light reception amount of the peak light reception amount Ppk and the light reception amount distribution signal, and an intersection point (=a midpoint) of the line of 100% of light reception amount of the peak light reception amount Ppk and the light reception amount distribution signal, a slope SL of a straight line through these two points can be obtained.

The inventor of the disclosure finds out that, these values, that is, the slope SL, the half-value width Why and the peak light reception amount Ppk in the waveform of the light reception amount distribution signal, have relatively strong correlative relationships with the error of the measured distance.

Figure 5:
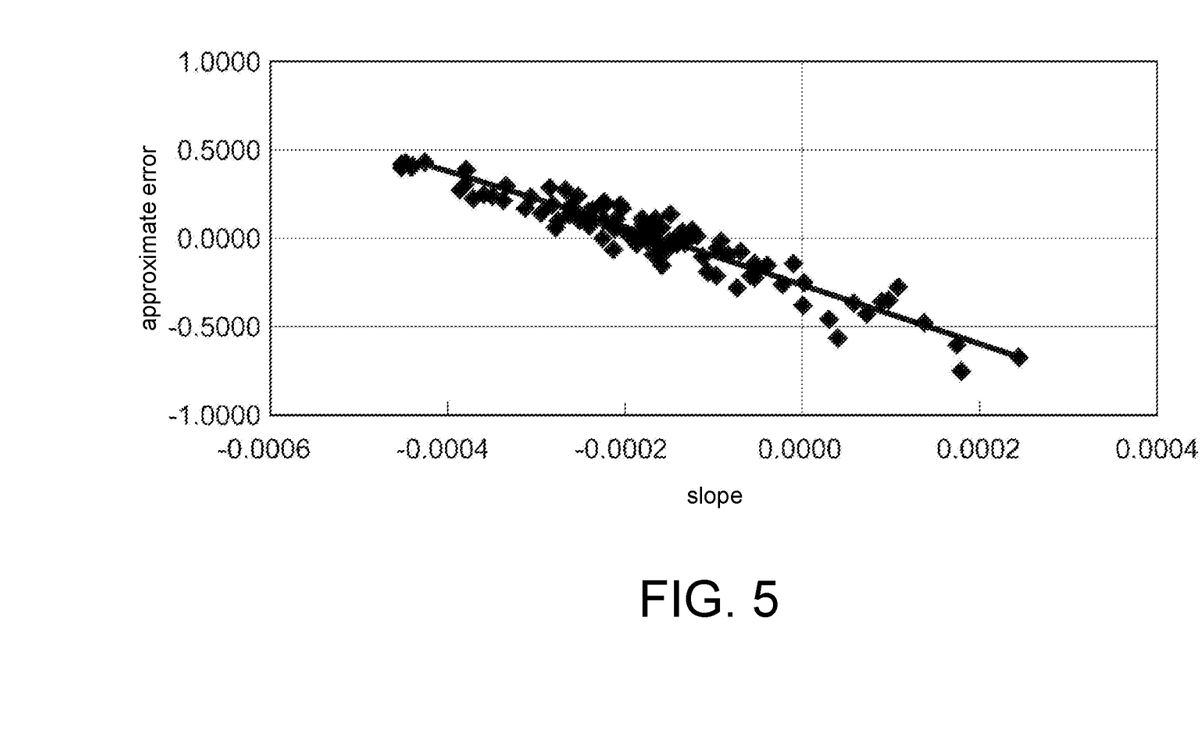
FIG. 5 is a graph illustrating one example of a relationship between a slope in the waveform of the light reception amount distribution signal and an error of a measured distance.
Figure 6:
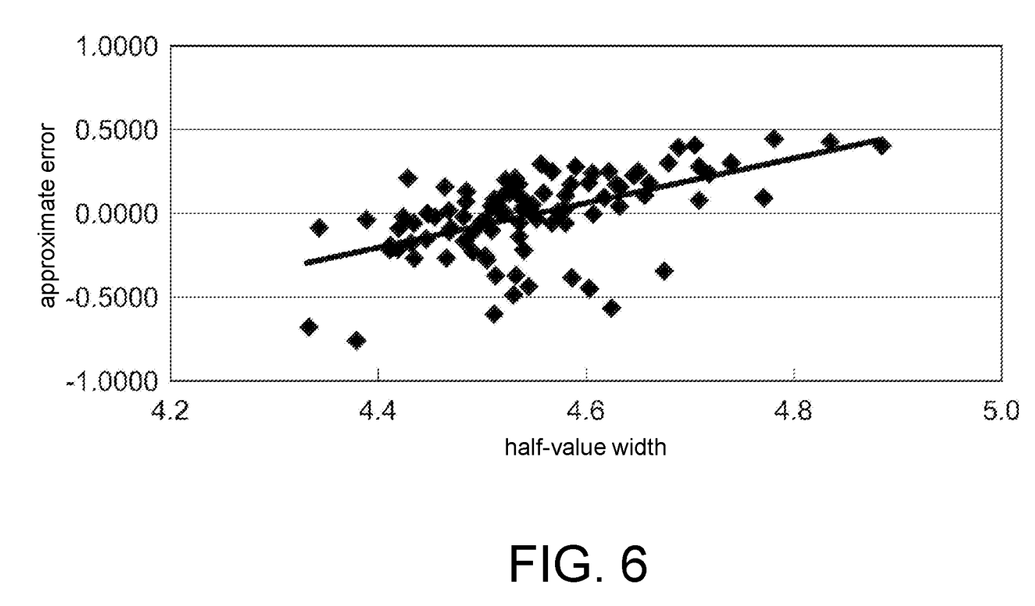
FIG. 6 is a graph illustrating one example of a relationship between a half-value width in the waveform of the light reception amount distribution signal and an error of a measured distance.
Figure 7:
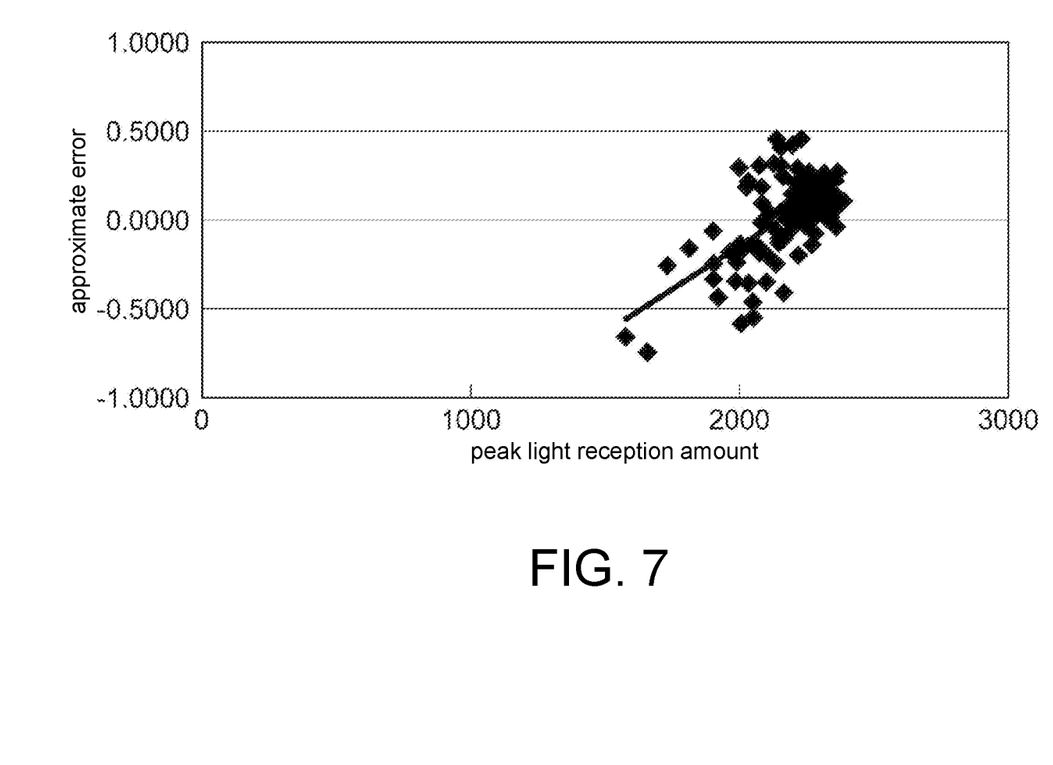
FIG. 7 is a graph illustrating one example of a relationship between a peak light reception amount in the waveform of the light reception amount distribution signal and an error of a measured distance.

Here, the relationships between the predefined characteristic values in the waveform of the light reception amount distribution signal and the error of the measured distance are described with reference to FIG. 5 to FIG. 7. FIG. 5 is a graph illustrating one example of the relationship between the slope SL in the waveform of the light reception amount distribution signal and the error of the measured distance. FIG. 6 is a graph illustrating one example of the relationship between the half-value width Why in the waveform of the light reception amount distribution signal and the error of the measured distance. FIG. 7 is a graph illustrating one example of the relationship between the peak light reception amount Ppk in the waveform of the light reception amount distribution signal and the error of the measured distance. The horizontal axis in FIG. 5 represents the slope SL in the waveform of the light reception amount distribution signal, the horizontal axis in FIG. 6 represents the half-value width Why in the waveform of the light reception amount distribution signal, and the horizontal axis in FIG. 7 represents the peak light reception amount Ppk in the waveform of the light reception amount distribution signal. In addition, in each graph, the vertical axis represents an approximate error of the measured distance. Furthermore, the target TA is configured by stainless (SUS) as its material, and the surface roughness Rz is 3.2 μm.

As shown in FIG. 5 to FIG. 7, the correlative relationships are confirmed between the slope SL, the half-value width Whv and the peak light reception amount Ppk in the waveform of the light reception amount distribution signal and the error of the measured distance. Therefore, the measured distance can be corrected with a high precision based on the correlative relationships between the slope SL, the half-value width Whv or the peak light reception amount Ppk in the waveform of the light reception amount distribution signal and the error of the measured distance, and the error of the measured distance can be further reduced.

The correlative relationships between the predefined characteristic values in the waveform of the light reception amount distribution signal and the error of the measured distance can be expressed in a table format. Therefore, the storage portion 53 may store the correlative relationships between the predefined characteristic values in the waveform of the light reception amount distribution signal and the error of the measured distance in the table format.

In addition, a numerical formula can be derived from a plurality of correlative relationships between the predefined characteristic values in the waveform of the light reception amount distribution signal and the error of the measured distance. That is, the correlative relationships between the predefined characteristic values in the waveform of the light reception amount distribution signal and the error of the measured distance are expressed by the numerical formula which uses the predefined characteristic values in the waveform of the light reception amount distribution signal as independent variables and the error of the measured distance as a dependent variable. Therefore, the storage portion 53 can also store the correlative relationships between the predefined characteristic values in the waveform of the light reception amount distribution signal and the error of the measured distance by the numerical formula. Accordingly, compared with the occasion when the correlative relationships are stored in the table format, a storage capacity of the storage portion 53 can be cut down.

In the numerical formula described above, the plurality of correlative relationships between the predefined characteristic values in the waveform of the light reception amount distribution signal and the error of the measured distance may be derived by applying an AI (Artificial Intelligence) study. On this occasion, the predefined characteristic values in the waveform of the light reception amount distribution signal and the error of the measured distance are studied as parameters by AI.

Returning to the description of FIG. 1, the acquirement portion 54 is configured to acquire the predefined characteristic values from the waveform of the light reception amount distribution signal. The acquirement portion 54 acquires, for example, the slope SL, the half-value width Whv or the peak light reception amount Ppk described above in the waveform of the light reception amount distribution signal.

The correction portion 52 reads out, for example, the correlative relationships described above from the storage portion 53, and obtains the error of the measured distance based on the correlative relationships and the predefined characteristic values acquired by the acquirement portion 54. Then, the correction portion 52 corrects the measured distance that is measured by the measurement portion 51 by subtracting the error from the measured distance. Accordingly, the optical measurement device 100 which is capable of simply correcting the measured distance and reduces the error of the measured distance can be realized easily.

The display portion 60 is configured to display the measured distance corrected by the correction portion 52. The display portion 60 may be configured to further display setting contents, a movement state, a communication state and the like. The display portion 60 is configured to include, for example, 7 or 11 segmented displays of a plurality of digits and a display lamp which glows in a plurality of colours.

The operation portion 70 is used to input information by an operation of a user. Specifically, the operation portion 70 is used to inputting information of the correlative relationships described above. The information of the correlative relationships may be, for example when the correlative relationships are expressed by the numerical formula, information of a coefficient and a constant of the numerical formula or a correction value when the correction portion 52 corrects the measured distance. The operation portion 70 can be configured to include, for example, a button, a switch or the like. On this occasion, when the user operates the button, the switch or the like, a signal corresponding to the operation is input to the control portion 50. Then, the control portion 50 generates data corresponding to the signal, thereby enabling the input of the information of the correlative relationships to the optical measurement device 100. Accordingly, for example, the information obtained in a usage environment of the user can be input, and the correlative relationships between the predefined characteristic values and the error of the measured distance can be altered or updated based on the information.

In this way, the sensor head 30 generates the chromatic aberration along the optical axis direction to the lights including a plurality of wavelength components and irradiates the lights to which the chromatic aberration is generated to the target TA, and the light reception portion 40 is configured to be capable of detecting the light reception amount for each wavelength component, thereby a white confocal optical measurement device 100 which reduces the error of the measured distance can be realized easily.

Figure 8:
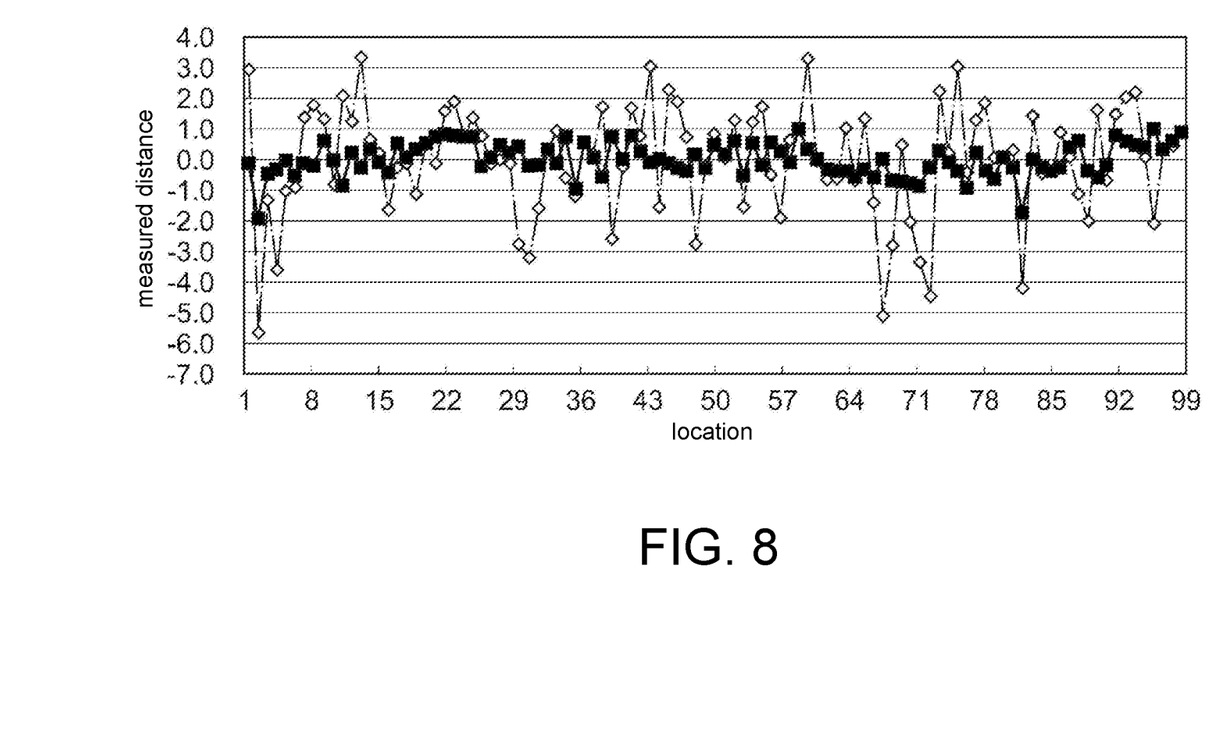
FIG. 8 is a graph illustrating one example of a measured distance of an optical measurement device of the embodiment.

Next, a measurement result of the optical measurement device 100 is described with reference to FIG. 8. FIG. 8 is a graph illustrating one example of the measured distance of the optical measurement device 100 of the embodiment. In FIG. 8, the horizontal axis represents a location in an X-axis direction shown in FIG. 1, and the vertical axis represents the measured distance of the optical measurement device 100 when a predefined reference value, for example, 20 mm is set as 0, and the unit is micrometre. In addition, the slope SL is used as the predefined characteristic value in the waveform of the light reception amount distribution signal, and the storage portion 53 stores the correlative relationship shown in FIG. 5. Therefore, the target TA is configured by stainless (SUS), and the surface roughness Rz is 3.2 μm. Furthermore, corrected measured distances are shown in a solid line and uncorrected measured distances are shown in a dashed line for comparison.

As shown in FIG. 8, an error greater than 3.2 μm, which is the surface roughness Rz, is generated in the uncorrected measured distances shown by the dashed line. In contrast, in all the locations in the X-axis direction, the corrected measured distances shown by the solid line are reduced to values of which the error is smaller than the surface roughness Rz of 3.2 μm.

In the embodiment, an example in which the target TA is stainless (SUS) is shown, but the disclosure is not limited to this. The optical measurement device 100 may be any device regardless of the type, the material, the shape or the like of the target TA as long as the lights from the sensor head 30 are reflected.

Figure 9:
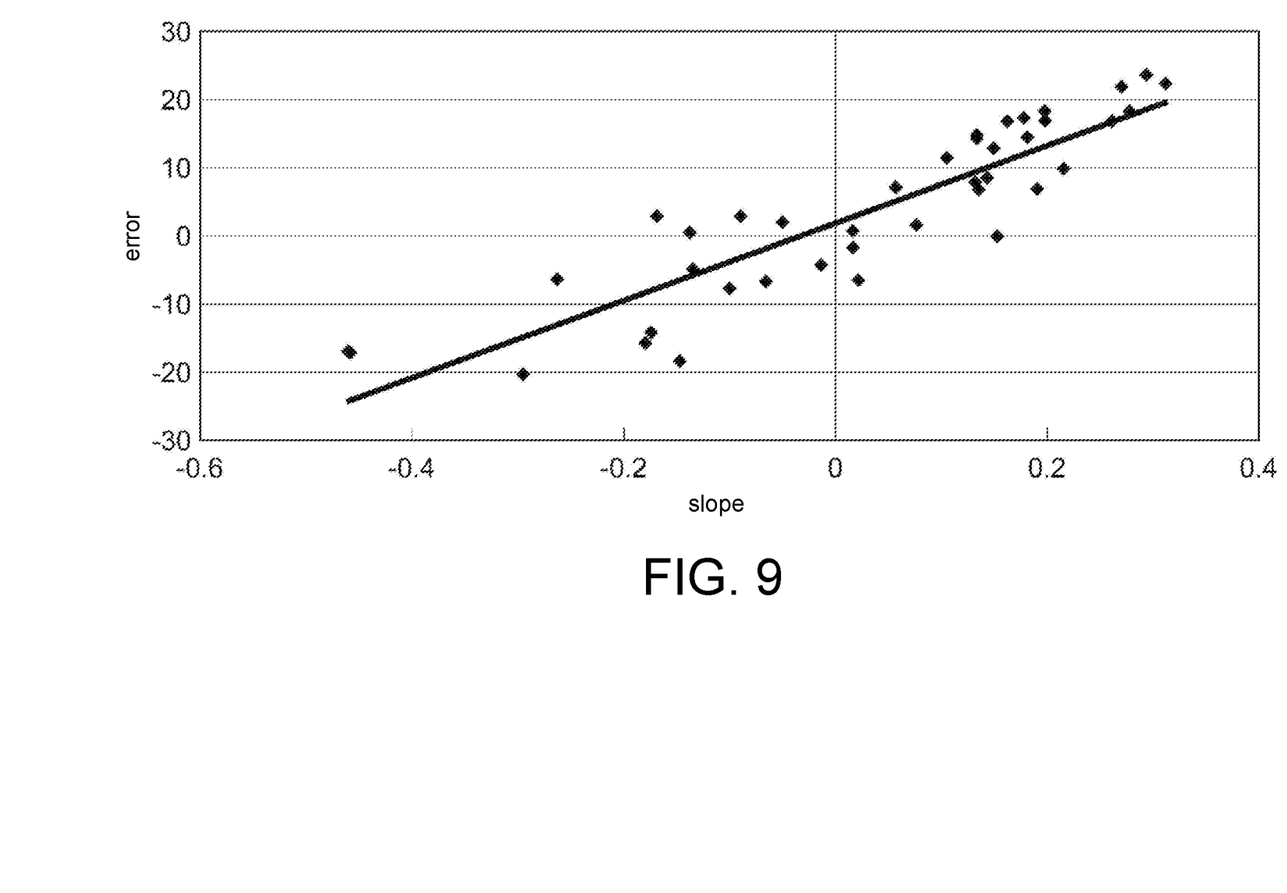
FIG. 9 is a graph illustrating another example between a slope in the waveform of the light reception amount distribution signal and an error of the measured distance.
Figure 10:
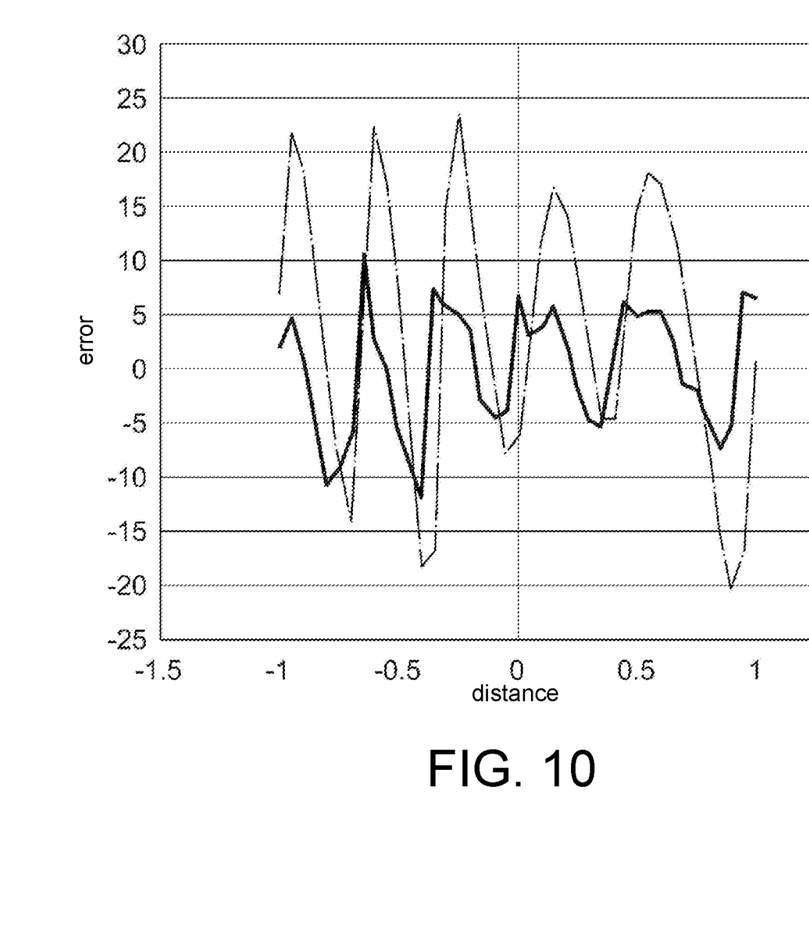
FIG. 10 is a graph illustrating another example of a measured distance of the optical measurement device of the embodiment.

FIG. 9 is a graph illustrating another example between the slope SL in the waveform of the light reception amount distribution signal and the error of the measured distance. FIG. 10 is a graph illustrating another example of the measured distance of the optical measurement device 100 of the embodiment. The horizontal axis in FIG. 9 represents the slope SL in the waveform of the light reception amount distribution signal, and the horizontal axis in FIG. 10 represents the distance, which is a distance (a height) in the X-axis direction shown in FIG. 1 and the distance when the predefined reference values, for example, 20 mm is set as 0, and the unit is millimetre. In each graph, the vertical axis represents the error of the measured distance, and the unit is micrometre. In addition, the target TA is a CMOS (Complementary MOS). Furthermore, the errors of the corrected measured distances are shown by a solid line and the errors of the uncorrected measured distances are shown in a dashed line for comparison.

As shown in FIG. 9, even when the target TA is the CMOS, a correlative relationship between the slope SL in the waveform of the light reception amount distribution signal and the error of the measured distance is confirmed.

In addition, as shown in FIG. 10, it is confirmed that the error of the measured distance can be reduced by correcting the measured distance based on the slope SL in the waveform of the light reception amount distribution signal regardless of the distance (the height) from the optical measurement device 100 to the target TA.

Furthermore, the target TA is not limited to the case that the surface of the target TA is planar. Although diagrams and description of the diagrams are omitted, the target TA can also be, for example, a lens or the like which has a curved surface. On this occasion, the error of the measured distance tends to become greater in a location where an angle of the curved surface is great, but the error of the measured distance can be reduced by correcting the measured distance based on the predefined characteristic values in the waveform of the light reception amount distribution signal.

In addition, in the embodiment, the example in which the optical measurement device 100 is white confocal is shown, but the optical measurement device 100 is not limited to this. The optical measurement device of the disclosure can also be a triangular distance measurement device for example. On this occasion, the optical measurement device may include a light source which emits lights, an optical system which condenses reflected lights reflected by a target TA, a light reception portion which obtains a light reception amount distribution signal of each pixel for the reflected lights, a measurement portion which measures, based on the light reception amount distribution signal, a distance from the optical measurement device to the target TA, and a correction portion which corrects the measured distance based on predefined characteristic values in a waveform of the light reception amount distribution signal.

In this way, according to the optical measurement device 100 and the optical measurement method of the embodiment, the measured distance that is measured is corrected based on the predefined characteristic values in the waveform of the light reception amount distribution signal. Here, the inventor of the disclosure finds out that there are correlative relationships between the predefined characteristic values in the waveform of the light reception amount distribution signal and the error of the measured distance. Therefore, the measured distance can be corrected based on the predefined characteristic values in the waveform of the light reception amount distribution signal by using the correlative relationships. Therefore, even when the distortion is generated in the light reception amount distribution signal, the error of the measured distance can be reduced.

The embodiments described above are used to facilitate the understanding of the disclosure and are not used to interpret the disclosure in a limitative way. Each component included in the embodiments and the arrangements, materials, conditions, shapes and sizes or the like of each component can be appropriately altered without being limited to the illustrated ones. In addition, configurations shown in different embodiments can be partially substituted or combined with one another.

APPENDIX

1. An optical measurement device 100, comprising:
a light source 10, which emits lights;
a sensor head 30, which condenses reflected lights reflected by a target TA;
a light reception portion 40, which is configured in a manner that each of a plurality of pixels is capable of detecting a light reception amount, and which obtains a light reception amount distribution signal of each pixel for the condensed reflected lights;

a measurement portion 51, which measures a distance from the optical measurement device 100 to the target TA based on the light reception amount distribution signal; and a correction portion 52, which corrects the measured distance based on a predefined characteristic value in a waveform of the light reception amount distribution signal.

8. An optical measurement method used by the optical measurement device 100, comprising:

a step in which the light source 10 emits lights;

a step in which the sensor head 30 condenses reflected lights reflected by the target TA;

a step in which the light reception portion 40 obtains a light reception amount distribution signal of each pixel for the condensed reflected lights, and in which the light reception portion 40 may be configured in a manner that each of a plurality of pixels is capable of detecting a light reception amount;

a step in which the measurement portion 51 measures a distance from the optical measurement device 100 to the target TA based on the light reception amount distribution signal; and a step in which the correction portion 52 corrects the measured distance that is measured based on a predefined characteristic value in a waveform of the light reception amount distribution signal.

According to the aspect, the measured distance is corrected based on the predefined characteristic value in the waveform of the light reception amount distribution signal. Here, the inventor of the disclosure finds out that there is a correlative relationship between the predefined characteristic value in the waveform of the light reception amount distribution signal and the error of the measured distance. Accordingly, the measured distance can be corrected based on the predefined characteristic value in the waveform of the light reception amount distribution signal by using the correlative relationship. Therefore, even if the distortion is generated in the light reception amount distribution signal, the error of the measured distance can be reduced.

In the aspect described above, the optical measurement device may further include a storage portion which stores the correlative relationship between the predefined characteristic value and the error of the measured distance, and an acquirement portion which acquires the predefined characteristic value from the waveform of the light reception amount distribution signal, and the correction portion may obtain the error of the measured distance based on the correlative relationship and the acquired predefined characteristic value and subtract the error from the measured distance.

According to the aspect, the error of the measured distance is obtained based on the correlative relationship and the acquired predefined characteristic value, and the error is subtracted from the measured distance. Accordingly, the optical measurement device which is capable of simply correcting the measured distance and reduces the error of the measured distance can be easily realized.

In the aspect described above, the correlative relationship may be expressed by a numerical formula which uses the predefined characteristic value as an independent variable and the error of the measured distance as a dependent variable.

According to the aspect, the correlative relationship is expressed by the numerical formula which uses the predefined characteristic value as an independent variable and the error of the measured distance as a dependent variable. Accordingly, compared with an occasion when the correlative relationship is expressed in a table format, a storage capacity of the storage portion can be cut down.

In the aspect described above, the optical measurement device may further include an operation portion which is used to input information of the correlative relationship.

According to the aspect, the optical measurement device further includes the operation portion which is used to input the information of the correlative relationship. Accordingly, for example, the information obtained in a usage environment of a user can be input, and the correlative relationship between the predefined characteristic value and the error of the measured distance can be altered or updated based on the information.

In the aspect described above, the predefined characteristic value may be a slope, a half-value width, or a peak light reception amount.

According to the aspect, the predefined characteristic value is the slope, the half-value width, or the peak light reception amount. Here, the inventor of the disclosure finds out that there is a relatively strong correlative relationship between the slope, the half-value width, or the peak light reception amount in the waveform of the light reception amount distribution signal and the error of the measured distance. Therefore, the measured distance can be corrected with a high precision based on the slope, the half-value width, or the peak light reception amount in the waveform of the light reception amount distribution signal and the error of the measured distance can be further reduced.

In the aspect described above, the optical system may include a single condenser lens which is used to condense the reflected lights.

According to the aspect, the optical system includes the single condenser lens which is used to condense the reflected lights. Accordingly, compared with an occasion when a plurality of condenser lenses is included, the optical system can be simplified.

In the aspect described above, the lights may include a plurality of wavelength components, the optical system may make a chromatic aberration generated to the lights along an optical axis direction and irradiate the lights to which the chromatic aberration is generated to the target, and the light reception portion may be configured to be capable of detecting the light reception amount for each wavelength component.

According to the aspect, the chromatic aberration along the optical axis direction is generated to the lights including the plurality of wavelength components, the lights to which the chromatic aberration is generated are irradiated to the target, and the light reception amount can be detected for each wavelength component. Accordingly, a white confocal optical measurement device which reduces the error of the measured distance can be easily realized.

According to the aspect, the measured distance is corrected based on the predefined characteristic value in the waveform of the light reception amount distribution signal. Here, the inventor of the disclosure finds out that there is a correlative relationship between the predefined characteristic value in the waveform of the light reception amount distribution signal and the error of the measured distance. Therefore, the measured distance can be corrected based on the predefined characteristic value in the waveform of the light reception amount distribution signal by using the correlative relationship. Therefore, even if distortion is generated in the light reception amount distribution signal, the error of the measured distance can be reduced.

In the aspect described above, the optical measurement method may further include a step in which a storage portion stores a correlative relationship between the predefined characteristic value and the error of the measured distance and a step in which an acquirement portion acquires the predefined characteristic value from the waveform of the light reception amount distribution signal, and the correction step includes that the correction portion obtains the error of the measured distance based on the correlative relationship and the acquired predefined characteristic value, and that the correction portion subtracts the error from the measured distance.

According to the aspect, the error of the measured distance is obtained based on the correlative relationship and the acquired predefined characteristic value, and the error is subtracted from the measured distance. Accordingly, the optical measurement device which is capable of simply correcting the measured distance and reduces the error of the measured distance can be easily realized.

In the aspect described above, the correlative relationship may be expressed by a numerical formula which uses the predefined characteristic value as an independent variable and the error of the measured distance as a dependent variable.

According to the aspect, the correlative relationship is expressed by the numerical formula which uses the predefined characteristic value as an independent variable and the error of the measured distance as a dependent variable. Accordingly, compared with an occasion when the correlative relationship is expressed in a table format, a storage capacity of the storage portion can be cut down.

In the aspect described above, a step in which information of the correlative relationship is input into an operation portion is further included.

According to the aspect, the step in which information of the correlative relationship is input into the operation portion is further included. Accordingly, for example, the information obtained in the usage environment of the user can be input, and the correlative relationship between the predefined characteristic value and the error of the measured distance can be altered or updated based on the information.

In the aspect described above, the predefined characteristic value may be a slope, a half-value width, or a peak light reception amount.

According to the aspect, the predefined characteristic value is the slope, the half-value width, or the peak light reception amount. Here, the inventor of the disclosure finds out that there is a relatively strong correlative relationship between the slope, the half-value width, or the peak light reception amount in the waveform of the light reception amount distribution signal and the error of the measured distance. Therefore, the measured distance can be corrected with a high precision based on the slope, the half-value width, or the peak light reception amount in the waveform of the light reception amount distribution signal and the error of the measured distance can be further reduced.

In the aspect described above, the optical system may include a single condenser lens which is used to condense the reflected lights.

According to the aspect, the optical system includes the single condenser lens which is used to condense the reflected lights. Accordingly, compared with an occasion when a plurality of condenser lenses is included, the optical system can be simplified.

In the aspect described above, the lights include a plurality of wavelength components, a step is further included in which the optical system generates a chromatic aberration along an optical axis direction to the lights and irradiates the lights to which the chromatic aberration is generated to the target, and the light reception portion is configured to be capable of detecting the light reception amount for each wavelength component.

According to the aspect, the chromatic aberration along the optical axis direction is generated to the lights including the plurality of wavelength components, the lights to which the chromatic aberration is generated are irradiated to the target, and the light reception amount can be detected for each wavelength component. Accordingly, a white confocal optical measurement device which reduces the error of the measured distance can be easily realized.

According the disclosure, the optical measurement device and the optical measurement method capable of reducing the error of the measured distance can be provided.

What is claimed is:

1. An optical measurement device, comprising:
   a light source, which emits lights;
   an optical system, which condenses reflected lights reflected by a target;
   a light reception portion, which is configured in a manner that each of a plurality of pixels is capable of detecting a light reception amount, and which obtains a light reception amount distribution signal of each pixel for the reflected lights being condensed; and
   a processor, which measures a distance from the optical measurement device to the target based on the light reception amount distribution signal, and
   corrects an error of the measured distance which is caused by a chromatic aberration of the optical system based on a predefined characteristic value in a waveform of the light reception amount distribution signal, wherein the predefined characteristic value is a half-value width.

2. The optical measurement device according to claim 1, further comprising:
   a memory, which stores a correlative relationship between the predefined characteristic value and an error value of the distance being measured,
   wherein the processor acquires the predefined characteristic value from the waveform of the light reception amount distribution signal; and
   wherein the processor obtains the error value of the distance being measured based on the correlative relationship and the predefined characteristic value being acquired, and subtracts the error value from the distance being measured.

3. The optical measurement device according to claim 2, wherein
   the correlative relationship is expressed by a numerical formula which uses the predefined characteristic value as an independent variable and the error value of the distance being measured as a dependent variable.

4. The optical measurement device according to claim 2, further comprising
   an interface which is used to input information of the correlative relationship.

5. The optical measurement device according to claim 1, wherein
   the optical system comprises a single condenser lens which is used to condense the reflected lights.

6. The optical measurement device according to claim 1, wherein
   the lights comprise a plurality of wavelength components;
   the optical system generates the chromatic aberration along an optical axis direction to the lights and irradiates the lights to which the chromatic aberration is generated to the target; and the light reception portion is configured to be detect the light reception amount for each wavelength component.

7. An optical measurement method used by an optical measurement device, comprising:

a step in which a light source emits lights;

a step in which an optical system condenses reflected lights reflected by a target;

a step in which a light reception portion obtains a light reception amount distribution signal of each pixel for the reflected lights being condensed, and in which the light reception portion is configured in a manner that each of a plurality of pixels is capable of detecting a light reception amount;

a step in which a processor measures a distance from the optical measurement device to the target based on the light reception amount distribution signal; and a step in which the processor corrects an error of the measured distance which is caused by a chromatic aberration of the optical system based on a predefined characteristic value in a waveform of the light reception amount distribution signal, wherein the predefined characteristic value is a half-value width.

8. The optical measurement method according to claim 7, further comprising:

a step in which a memory stores a correlative relationship between the predefined characteristic value and an error value of the distance being measured; and a step in which the processor acquires the predefined characteristic value from a waveform of the light reception amount distribution signal, wherein the step of correction comprises that the processor obtains the error value of the distance being measured based on the correlative relationship and the predefined characteristic value being acquired, and that the processor subtracts the error value from the distance being measured.

9. The optical measurement method according to claim 8, wherein the correlative relationship is expressed by a numerical formula which uses the predefined characteristic value as an independent variable and the error value of the distance being measured as a dependent variable.

10. The optical measurement method according to claim 8, further comprising a step in which information of the correlative relationship is input into an interface.

11. The optical measurement method according to claim 7, wherein the optical system comprises a single condenser lens which is used to condense the reflected lights.

12. The optical measurement method according to claim 7, wherein the lights comprise a plurality of wavelength components;

a step is further included in which the optical system generates the chromatic aberration along an optical axis direction to the lights and irradiates the lights to which the chromatic aberration is generated to the target; and a step in which the light reception portion is configured to detect the light reception amount for each wavelength component.

13. The optical measurement device according to claim 1, wherein the processor corrects the error of the measured distance based on a slope formed between a midpoint of the half-value width at a half of a peak light reception amount in the waveform of the light reception amount distribution signal and a maximum point indicating the peak light reception amount in the waveform of the light reception amount distribution signal.

14. The optical measure device according to claim 1, wherein the error of the measured distance includes a shift in waveform of the light reception amount distribution signal caused by a peak light reception amount.

* * * * *